United States Patent [19]
Andeen

[11] 3,968,352
[45] July 6, 1976

[54] TORQUE CONTROL SYSTEM FOR REACTION WHEEL ASSEMBLIES AND THE LIKE

[75] Inventor: Richard E. Andeen, Scottsdale, Ariz.

[73] Assignee: Sperry Rand Corporation, New York, N.Y.

[22] Filed: May 17, 1974

[21] Appl. No.: 470,879

[52] U.S. Cl. .............................. 235/150.1; 244/164; 74/5.6 R; 235/150.2
[51] Int. Cl.² .................................... G01C 19/08
[58] Field of Search ........... 318/618, 580, 582, 584, 318/586, 566, 600, 603, 604; 235/150.2, 150.27; 244/165, 170; 74/5.6 R

[56] References Cited
UNITED STATES PATENTS

| | | | |
|---|---|---|---|
| 3,665,281 | 5/1972 | Hirokawa | 318/580 |
| 3,741,500 | 6/1973 | Liden | 244/165 |

Primary Examiner—Eugene G. Botz
Attorney, Agent, or Firm—Howard P. Terry; Thomas J. Scott

[57] ABSTRACT

An improvement in torque control systems for reaction wheel assemblies and the like used primarily for stabilizing space vehicles such as satellites including means for integrating the torque command signal and combining the integrated torque command signal with a feedback signal proportional to the angular speed of the rotor of the reaction wheel assembly thereby producing an error signal proportional to the difference between the integrated torque command signal and the angular speed signal. The error signal is coupled to the rotor spin motor which produces a resultant output torque that has been compensated for disturbance torques and other anomalies whereby the resultant torque applied to the rotor and consequently to the satellite is substantially equal to the commanded torque.

16 Claims, 5 Drawing Figures

TORQUE CONTROL SYSTEM FOR REACTION WHEEL ASSEMBLIES AND THE LIKE

BACKGROUND OF THE INVENTION

1. Field of the Invention

The subject invention relates to an improvement in control systems for Reaction Wheel Assemblies (RWAs) or Momentum Wheel Assemblies (MWAs) which are variable speed actuators used primarily for stabilizing space vehicles such as satellites.

2. Description of the Prior Art

Reaction Wheel Assemblies (RWs) and Momentum Wheel Assemblies (MWAs) belong to a class of devices generically referred to as momentum-exchange actuators. There are two types of momentum-exchange actuators: the variable speed type which includes RWAs and MWAs and the constant speed type which includes Control Moment Gyroscopes (CMGs). The variable-speed actuator is basically an electrical motor coupled to a flywheel which is referred to as the rotor or sensitive element of the RWA.

Momentum-exchange actuators are used in momentum-exchange systems to control the attitude of space vehicles. In these systems, momentum is transferred between the momentum storage device, i.e., the inertial element of the RWA or CMG, and the vehicle. In a system employing an RWA or MWA, attitude control is produced by changing the apportionment of the total angular momentum of the system which is held constant, between the momentum storage device and the vehicle. The apportionment of this momentum is changed by the control torque which is exerted on the vehicle by the RWA and is proportional to the motor's reaction torque as the rotor is accelerated or decelerated. This control torque is equal to the product of the rotor's inertia and its angular acceleration. The momentum storage capacity of the inertial system is the product of the rotor's inertia and the maximum speed produced by its spin motor. The magnitude of the angular momentum, H, of the RWA is variable and proportional to the angular velocity of the sensitive element while the direction of the angular momentum, H, with respect to the vehicle is fixed.

In prior art RWA control systems a computer processes data received from sensors which monitor the attitude of the vehicle. The computer produces an output signal which is the torque command signal $T_C$, for application to the sensitive element of the RWA. The torque command signal is coupled through an amplifier and applied to the windings in a torquer motor. The resultant change in current flow in the torquer windings produces a change in the force exerted on the rotor of the motor which is coupled to the shaft of the sensitive element. The resultant torque applied to the sensitive element produces an acceleration or a deceleration of the rotational velocity, $\omega$, of the sensitive element.

However, the torque produced by the motor, $T_M$, is adversely affected by disturbance torques, $T_B$, which adversely affect the motor torque by increasing or decreasing, depending upon the direction of rotation of the sensitive element, the actual torque, $T_V$, applied to the shaft of the sensitive element. Since the actual torque, $T_V$, is not equal to the commanded torque, $T_C$, inaccuracies in the space vehicle attitude are produced. In order to obtain accurate control of the space vehicle, attitude means must be provided to enable the actual torque, $T_V$, to be substantially equal to the commanded torque, $T_C$. This requires the provision of means which will compensate for the adverse effects produced by the action of the disturbance torques, $T_B$, on the motor torque, $T_M$.

The closed-loop control improvement described herein provides a simple relatively inexpensive means for providing accurate control of the actual torques applied to the sensitive element by compensating for the adverse effects of the disturbance torques, $T_B$.

SUMMARY OF THE INVENTION

The subject invention is an improvement in the torque command control circuit of a Reaction Wheel Assembly. In an analog embodiment of the invention, the improvement comprises the addition of a feedback loop including a tachometer which senses the angular velocity of the inertial element and provides an electrical output signal proportional thereto. This output signal is applied to an inverting input terminal of an operational amplifier where it is combined with the output signal from an integrator which has its input terminal coupled to the output terminal of a computer. The computer receives input signals from sensors on the vehicle and processes these signals to provide an electrical output signal, $T_C$, which is the desired torque command signal. The difference output signal from the operational amplifier is an error signal, $\epsilon$, proportional to the difference between the integrated torque command signal, $T_C$, and the actual rotor angular speed signal, $\omega$, which in turn is proportional to the integrated actual torque, $T_V$, applied to the rotor. This error signal is coupled to the torquer motor which produces an output torque, $T_M$. However, this output torque is subject to disturbance torques, $T_B$, which result from friction and windage torques and other anomalies in the control system. The sensitive element rotates at an increased or decreased angular velocity, $\omega$, in response to the application of the resultant torque, $T_V$.

The error signal, $\epsilon$, will be generated until the torque applied to the vehicle, $T_V$, is substantially equal to the commanded torque, $T_C$, which in turn is equal to the output torque from the motor, $T_M$, plus the effect of the disturbance torques, $T_B$. Therefore, the improved torque control circuit produces an actual torque applied to the rotor which is substantially equal to the commanded torque from the computer.

DESCRIPTION OF THE PREFERRED EMBODIMENTS

Figure 1:
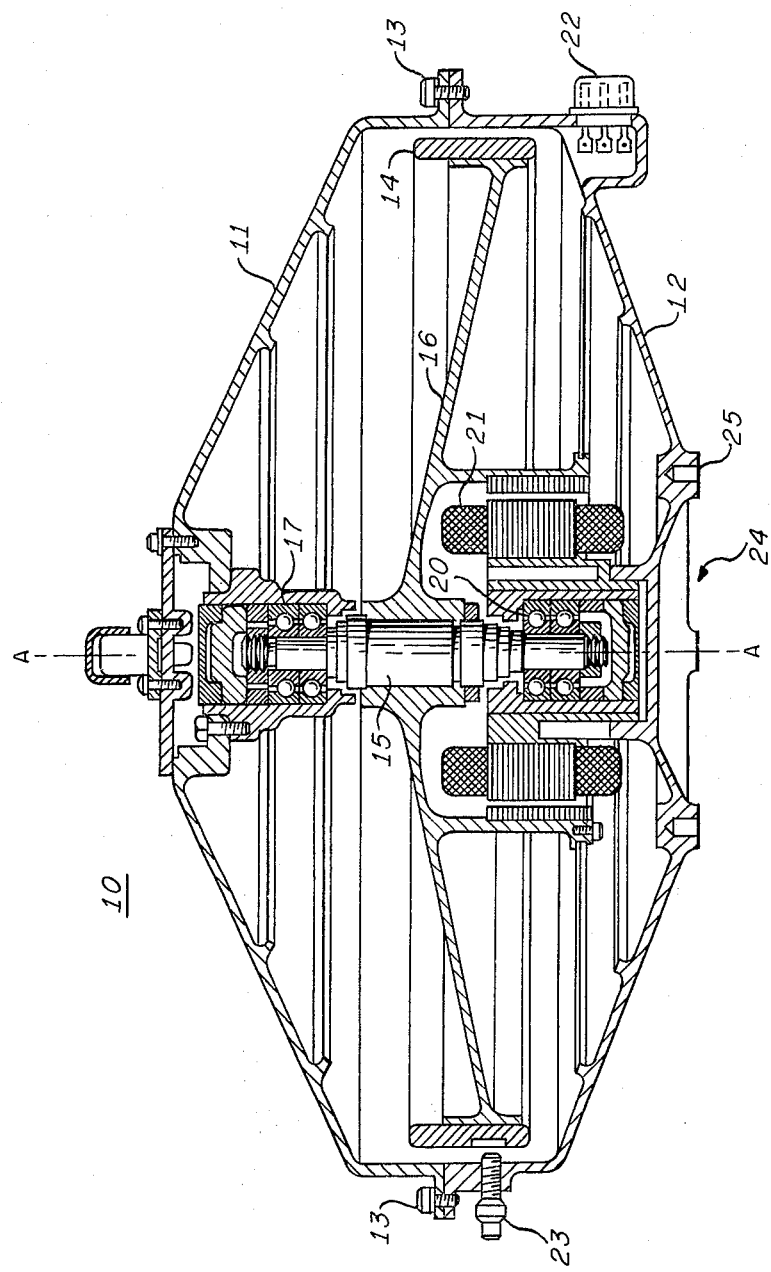
FIG. 1 is a cross sectional view of a typical reaction wheel assembly incorporating the invention.

FIG. 1 illustrates a Reaction Wheel Assembly 10 including a cover 11 affixed to a case 12 by suitable fastening devices such as the securing screws 13. Disposed within the enclosure formed by the cover 11 and the case 12 is a sensitive element or rotor 14 having a large inertia to weight ratio. The inertial element 14 is fixedly connected to shaft 15 through a rib structure 16 which may be in the form of a spoked wheel or a disk.

The shaft 15 is rotatably supported at one end in a fixed bearing 17 and at the other end by a floating bearing 20 to provide rotation about the shaft axis A—A. The shaft 16 and rotor 14 are rotatably driven about the shaft axis A—A by a spin motor 21 which is disposed in the case 12. The spin motor 21 functions as a torquer motor by controlling the angular velocity, $\omega$, of the rotor 14. A motor connector 22 provides means for coupling electrical energy into the spin motor 21.

A rate sensing device 23 for sensing the angular rotation of the rotor 14 about the axis A—A may comprise an inductive tachometer or other suitable means which cooperates with means on the rotor 14, such as a plurality of holes drilled in the surface of the rim proximate the tachometer, to provide an electrical output signal, such as a train of pulses, which is proportional to the angular velocity of the rotor 14. The Reaction Wheel Assembly 10 may be secured to a vehicle by suitable mounting means such as a mounting interface 24 which includes threaded holes 25.

Figure 2:
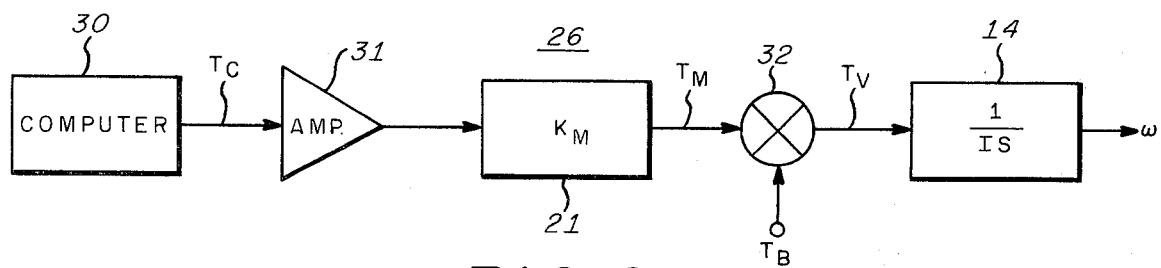
FIG. 2 is a schematic block diagram of a prior art open loop torque control circuit.

As shown in FIG. 2, a prior art torque control circuit 26 is an open loop circuit comprised of a computer 30 which receives data inputs from sensors within the vehicle that monitor the attitude of the vehicle. The computer 30 processes this data and produces a torque command signal, $T_C$, which is coupled through an amplifier 31 having a transfer function, A, to the windings of a torquer motor, i.e., spin motor 21 that produces an output motor torque, $T_M$. This output motor torque is a function of the motor parameters designated by the factor $K_M$ and is related to the torque command signal in accordance with the following expression:

$$T_M = AK_M T_C.$$

The output motor torque, $T_M$, is adversely affected by disturbance torques, $T_B$. Disturbance torques are due to the bearing and windage friction torques in the motor and bearing mountings for the rotor 14. The term disturbance torques also includes adverse effects due to other anomalies in the system, for example, characteristics of the motor and associated electronics which are a function of temperature, the velocity of the rotor 14 and the voltages produced by the source of electrical power. Thus, the element designated 32 in FIG. 2 is not an actual circuit element such as a summation circuit, rather it is a simplified drafting representation of how the disturbance torques and other anomalies adversely affect the motor torque produced by the motor 21.

As a result of the adverse effects due to the presence of the disturbance torques and other anomalies, the actual torque, $T_V$, applied to the sensitives element or rotor 14 is expressed as a function of torque command or motor torque as follows:

$$T_V = T_M - T_B$$

$$T_V = AK_M T_C - T_B$$

The transfer function of the rotor 14 is $1/IS$ which when acted upon by the actual torque produces a new value of angular velocity, $\omega$, expressed as:

$$\omega = T_V/IS.$$

It will be appreciated from the foregoing discussion that the accuracy of attitude control produced by an open loop control torque command circuit is deficient because of the adverse effects produced by the disturbance torques, $T_B$.

In order to provide accurate control of the vehicle it is necessary that the actual torque applied to accelerate or decelerate the rotor 14 correspond as closely as possible to the commanded torque because the torque supplied to the vehicle is exactly equal and opposite to the actual torque applied to the rotor 14. This follows from the following mathematical analysis:

The angular momentum, H, of the rotor 14 is equal to the product of the inertia, I, of the rotor 14 and its angular velocity, $\omega$. If the inertia, I, is expressed in slug-feet$^2$ and $\omega$ is expressed in radians/second, then the torque, T, is given in foot-pounds.

The angular momentum of the vehicle, assuming that it rotates about the same axis as the rotor 14, is a product of the inertia of the vehicle, J, and its angular velocity, $\alpha$. A fundamental physical law states that angular momentum is conserved, i.e., if the angular momentum of the rotor 14 is changed then the angular momentum of the vehicle must change in an equal but opposite amount. Ordinarily, I and J are constant, i.e., whenever a torque is applied to accelerate or decelerate the rotor 14, the vehicle will also accelerate or decelerate by an amount given by the following relationship:

$$I \Delta\omega + J \Delta\alpha = 0$$

Another fundamental law of physics states that the torque producing a change in angular momentum is related to that change as follows:

$$T = \Delta H/\Delta t$$

where $t$ is the time in seconds and H is the angular momentum expressed in foot-pound-seconds. Defining $T_V$ as the actual torque applied to the rotor 14 and $T_S$ as the vehicle torque results in the following expressions:

$$T_V = I \Delta\omega /\Delta t \text{ and } T_S = J \Delta\alpha /\Delta t$$

Since $I \Delta\omega + J \Delta\alpha = 0$, then it follows that:

$$T_S = -T_V.$$

Thus the torque applied to the vehicle is equal and opposite to the actual torque applied to the rotor 14. Since the commanded torque, $T_C$, is the computed torque required to be applied to the vehicle to control its attitude, it is necessary that the actual torque applied to the rotor 14 follow the commanded torque as closely as possible.

Figure 3:
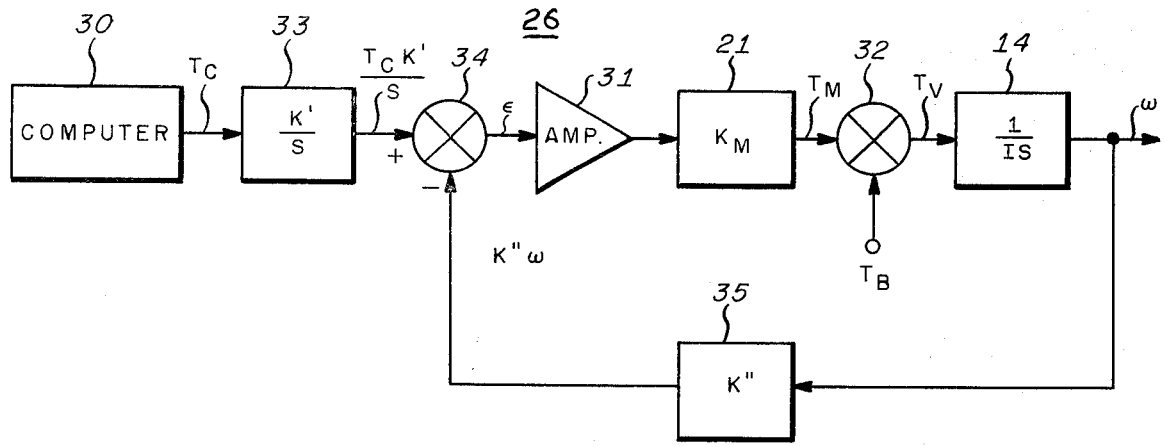
FIG. 3 is a schematic block diagram of the closed-loop torque control system of the present invention.

The modified torque control loop shown in FIG. 3 includes means for enabling the actual torque applied to the rotor 14 to be substantially equal to the commanded torque. As shown in FIG. 3 the torque control circuit 26 includes an integrator 33 having a transfer function $K'/S$ coupled to the output of the computer 30 for producing an integrated output signal $T_C K'/S$ which is coupled to a combining circuit 34. A second input to the combining circuit 34 is coupled to the output of a velocity sensing device 35 having a transfer function $K''$. The velocity sensing device 35 produces an output signal $\omega K''$, which is coupled into the combining element 34 and is subtracted from the integrator output signal $T_C K'/S$ to produce an error output signal, $\epsilon$. The remainder of the torque control circuit shown in FIG. 3 is identical to the torque control circuit shown in FIG. 2 except that the input signal coupled into the amplifier 31 is the error signal, $\epsilon$, in place of the commanded torque signal, $T_C$.

The actual torque, $T_V$, applied to the rotor 14 in the configuration shown in FIG. 3 is derived as follows:

$$T_C K'/S = T_V K''/IS$$

$$T_V = T_C(K'I/K'')$$

The foregoing equality exists for values of $\epsilon$ approaching zero which result when the amplifier 31 has large values of amplification. Typically the combining element 34 and the amplifier 31 shown as separate elements in FIG. 3 may be a single element in actual practice such as an operational amplifier having a first non-inverting input terminal which may be coupled to the output of the integrator 33 and a second inverting input terminal which may be coupled through an appropriate matching circuit to the output of the velocity sensing device 35. An amplification factor of 20 was sufficient for a rotor 14 having an inertia, I = 1/200 ft-lb-sec$^2$ to provide error signals having substantially minimal values.

Figure 4:
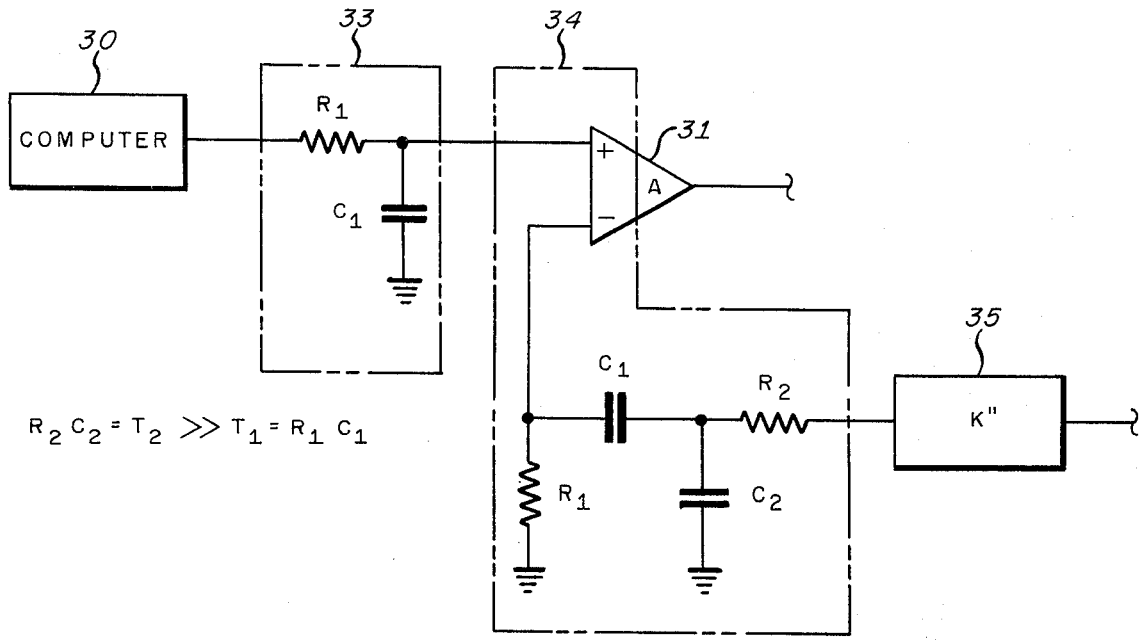
FIG. 4 is a schematic diagram of typical analog circuits which may be employed in the closed-loop torque control circuit of the invention.

The integrator 33 may be implemented in a practical embodiment as shown in FIG. 4 by an RC circuit coupled between the computer 30 and the amplifier 31. A resistor $R_1$ has a first input terminal connected to the output terminal on the computer 30 and a second input terminal connected to the junction of the first terminal on a capacitor $C_1$ and the non-inverting input terminal on the operational amplifier 31. The second terminal on the capacitor $C_1$ is coupled to ground. The combination of the resistor $R_1$ and the capacitor $C_1$ has a time constant, $T_1$.

The output of the velocity sensing device 35 is coupled through an appropriate matching circuit including a filter comprised of the series combination of a resistor $R_2$ and a capacitor $C_1$ coupled between the output of the velocity sensing device 35 and the inverting input terminal on the amplifier 31. A capacitor $C_2$ has its first terminal coupled to the junction of the resistor $R_2$ and the capacitor $C_1$. The first terminal on a second resistor $R_1$ is connected to the junction of the capacitor $C_1$ and the inverting input terminal on the amplifier 31. The second terminals on the capacitor $C_2$ and the resistor $R_1$ are coupled to ground. The time constant of the resistor capacitor combination $R_2C_2$ is $T_2$. The magnitude of the second time constant $T_2$ is very much greater than the value of the time constant $T_1$.

In the configuration shown in FIG. 4 the integrator 33 of FIG. 3 is comprised of the filter circuit $R_1C_1$ and has a transfer function: $T_1/T_1S + 1$. The velocity sensing device 35 is coupled into the matching circuit comprised of $R_1$, $C_1$ and $R_2$, $C_2$. Since $T_2$ is very much greater than $T_1$, it has a negligible effect on the transfer characteristic. As a result, the matching circuit has a transfer function:

$$T_1S / T_1S + 1$$

The angular velocity, $\omega = T_V/IS$; the amplification factor, A, of the amplifier 31 is large and $\epsilon \to 0$, therefore:

$$T_C (T_1/T_1S+1) = T_V/IS \times (T_1S/T_1S+1)$$

$$T_C = T_V$$

Figure 5:
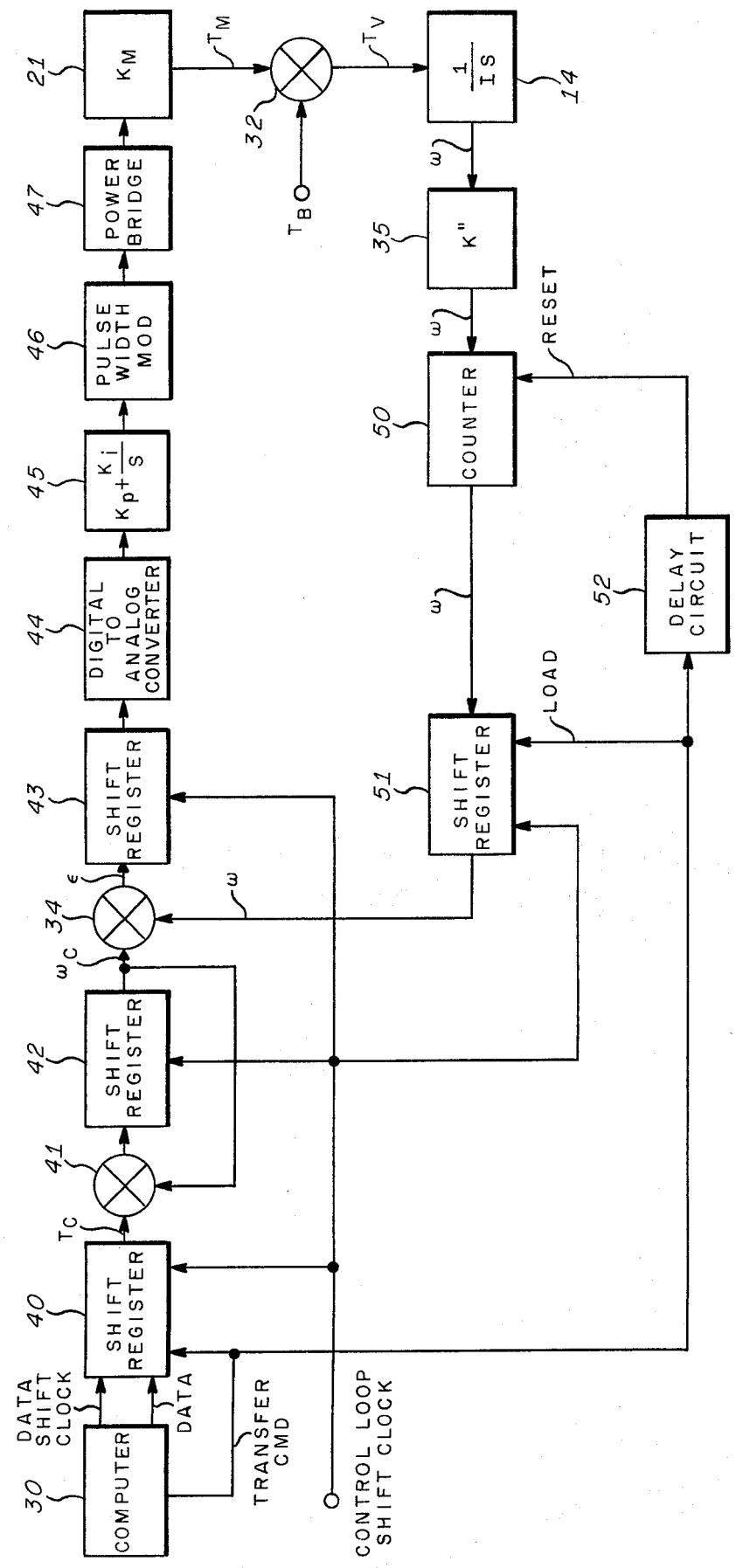
FIG. 5 is a schematic block diagram of an embodiment of the closed-loop torque control system of the invention embodying digital control circuits.

An alternate embodiment of the subject invention employing digital elements is shown in block form in FIG. 5. Elements which correspond to respective elements shown in FIGS. 3 and 4, are designated by the same reference characters. The computer 30 of FIG. 5 produces output data in the form of a series of pulses, zeros and ones, which is coupled into a shift register 40. Also applied to the shift register 40 is a data clock input signal which controls the loading of the computer data into the shift register 40. After the data for a particular torque command signal is loaded into the shift register 40, a transfer command pulse is applied to the shift register 40 thereby initiating transfer of the stored computer data into a summation circuit 41 which has a first input terminal coupled to the output terminal of the shift register 40. The summation circuit 41 may be a digital adder which has its second input terminal coupled to the output of a second shift register 42. The summation circuit 41 provides an output signal in the form of a series of pulses equal to the sum of the two signals applied at its input terminals. In effect, the output of the shift register 42 is combined with the output signal from the first shift register 40 thus computing the time integral of the torque command signal, $T_C$.

Second shift register 42 provides an output signal corresponding to the integral of the torque command signal, $T_C$, with respect to time, which is a commanded angular velocity signal, $\omega_C$. This commanded angular velocity signal in the form of a series of pulses is coupled into a second summation circuit 34 which corresponds to the summation circuit 34 in the analog configurations shown in FIGS. 3 and 4. The summation circuit 34, which may be a digital subtractor, has the commanded angular velocity signal, $\omega_C$, coupled into a first input terminal and a feedback signal which will be discussed below, coupled into a second input terminal.

The summation circuit 34 produces an output error signal, $\epsilon$, proportional to the difference between the commanded angular velocity, $\omega_C$, and the actual angular velocity, $\omega$, which is coupled into a third shift register 43. The output error signal, $\epsilon$, is a series of pulses which are stored in the shift register 43 and transferred as a plurality of parallel outputs to a digital-to-analog converter 44. The digital-to-analog converter 44 may be a resistive ladder network including a plurality of transistorized switches which produce a variable amplitude d.c. analog output voltage proportional to the digital input signal received from the third shift register 43.

The d.c. analog output voltage is coupled into a second integrator 45 having a transfer characteristic equal to $k_p + k_i/S$. The symbol $k_p$ represents a gain proportional to the variable amplitude of the input d.c. analog voltage and $k_i/S$ is the transfer function of an analog integrator wherein $1/S$ represents integration and $k_i$ is the gain associated with the integrator. The integrated output d.c. voltage is coupled to the input of a pulse width modulator 46 which produces a variable pulse width output voltage having pulse widths proportional to the amplitude of the integrated output d.c. voltage.

The variable pulse width voltage is applied across the input terminals of a power bridge 47 which may be comprised of a transistorized switching amplifier and commutating diodes.

Alternatively, the variable output voltage from the integrator 45 may be coupled through a linear power amplifier to the torque motor 21 thereby obviating the need for the pulse width modulator 46 and power bridge 47. The torque motor 21, which corresponds to the spin motor 21 in FIG. 1 and the torque motors 21 in FIGS. 2 and 3, is coupled across the output terminals of the power bridge 47 and produces an output torque, $T_M$, which is subject to the adverse effects of disturbance torques, $T_B$. These adverse effects combining with the output motor torque are represented diagramatically by the comining element 32 which corresponds to the combining element 32 in FIGS. 2 and 3.

The actual applied torque, $T_V = T_M - T_B$, is applied to the rotor 14 which has a transfer characteristic represented by the transfer function, $1/IS$. A digital sensing device 35, comparable to the sensing devices 35 in FIGS. 3 and 4, also has a transfer characteristic $K''$ and senses the actual angular rotation, $\omega$, of the rotor 14 produced by the actual applied torque, $T_V$. The digital output signals from the sensing device 35 are coupled into a counter 50 which provides a digital output signal proportional to the angular velocity, $\omega$, of the rotor 14. The digital output signal from the counter 50 is transferred into a shift register 51 upon the application of a transfer command pulse to the shift register 51. The transfer command pulse is also applied to a delay circuit 52 which has a delay time sufficient to allow the data in the counter 50 to be transferred to the shift register 51 after which a reset pulse is produced at the output of the delay circuit 52 and applied to the counter 50. The shift register 51 provides a serial digital output signal that is coupled into the inverting input terminal on the summation circuit 34. The serial digital output signal is the feedback signal referred to above which is coupled into the second input terminal of the summation circuit 34 and is proportional to the actual angular velocity, $\omega$, of the rotor 14.

In operation, the computer 30 produces a serial binary output number in the form of a serial train of pulses which is clocked into the first shift register 40 at the clock frequency of the data shift clock pulses received from the computer 30.

The first shift register 40 functions as a storage device which retains the data from the computer 30 until it receives a transfer command pulse from the computer 30 which occurs at the update rate of the data, or some multiple thereof. In one embodiment this data was updated every 0.4 second and the transfer command pulse was repeated every 0.1 second. The serial binary number in the shift register 40 is shifted into the summation circuit 41 subsequent to the occurrence of the transfer pulse. The transfer of the data from the shift register 40 to the summation circuit 41 occurs at the clock frequency of the control loop shift clock pulses which are also applied to the shift registers 42, 43 and 51. Thus, the commanded torque signal is clocked into the summation circuit 41 at the same frequency as the commanded angular velocity signal, $\omega_C$, which is fed back into the second input of the summation circuit 41.

The commanded angular velocity signal, $\omega_C$, is also clocked into the summation circuit 34 at the clock frequency of the control loop shift clock and is combined therein with the actual angular velocity, $\omega$, clocked from the shift register 51 at the clock frequency of the control loop shift clock pulses. The difference binary serial output signal from the summation circuit 41 is coupled into the shift register 43 at the clock frequency of the control loop shift clock pulses. The shift register 43 provides a plurality of parallel output signals which constitute a binary number equivalent to the magnitude of the error signal, $\epsilon$. This binary number is coupled into the digital-to-analog converter 44 which produces a d.c. output voltage having a variable amplitude that is proportional to the binary number representative of the error signal, $\epsilon$.

The variable amplitude d.c. output voltage is coupled into an integrator 45 which integrates the variable amplitude d.c. voltage in order to provide, at all times, some minimal level of d.c. output voltage. Without the integrator 45, when the instantaneous value of the error signal, $\epsilon$, goes to zero, because of the feedback control loop, there would be no input signal coupled through the pulse width modulator 46 and power bridge 47 to the motor 21 to maintain the rotor 14 spinning at some minimum speed. Thus, the integrator 45 insures a minimal level of input signal is coupled through the pulse width modulator 46 and power bridge 47 into the motor 21 at all times. Any change in the amplitude of the error signal, $\epsilon$, produces a change in the amplitude of the integrated voltage which is coupled through the pulse width modulator 46 and power bridge 47 to the torquer motor 21. As a result, the output motor torque $T_M$ experiences a corresponding change which produces a change in the actual torque, $T_V$, applied to the rotor 14. A change in the magnitude of the actual torque, $T_V$, produces a change in the angular velocity, $\omega$, of the rotor 14. This change in angular velocity, $\omega$, is sensed by the velocity sensing means 35 which in one embodiment was an optical digital tachometer that produced 4096 output pulses per revolution of the rotor 14.

The counter 50 which is cleared by the reset pulse received from the delay circuit 52 receives the pulses from the digital sensing device 35 for a period of time equal to the period between the reception of the reset pulse from the dealy circuit 52 and the occurrence of the transfer command pulse at the shift register 51. The data information in the counter 50 is transferred to the shift register 51 when the transfer command pulse is applied to the shift register 51. The number of pulses represented by the count accumulated in the counter 50 during the time between the reset pulse and the transfer command pulse is representative of the angular velocity, $\omega$, of the rotor 14.

After the data in the counter 50 is transferred to the shift register 51, this data is coupled into the second input terminal of the summation circuit 34 at the frequency of the control loop shift clock pulses which is identical to the frequency at which the pulses equivalent to the commanded angular velocity, $\omega_C$, are coupled into the first input terminal on the summation circuit 34.

In the embodiment in which the data was coupled from the computer 30 to the shift register 40 at an update rate of 0.4 seconds, the data in the feedback control loop including shift registers 42, 43 and 51 was updated every 0.1 seconds. Additionally, the range of actual torques applied to the rotor 14 in this embodiment, was 0–30 ounce-inches with a minimum step torque of 0.1 ounce-inches. The resultant accuracy of the torques applied to the rotor 14 obtained with this embodiment was 1%.

While the invention has been described in its preferred embodiment(s), it is to be understood that the words which have been used are words of description rather than limitation and that changes may be made within the purview of the appended claims without departing from the true scope and spirit of the invention in its broader aspects.

I claim:

1. A control torque command circuit in a reaction wheel assembly which includes a sensitive element rotating at an angular velocity, $\omega$, for controlling the attitude of a vehicle comprising
   means for computing a desired torque command signal to control the attitude of said vehicle and providing said torque command signal at an output terminal of said computing means,
   means coupled to said output terminal of said computing means for integrating said torque command signal and producing an integrated torque command output signal,
   sensing means for measuring the angular velocity, $\omega$, of said sensitive element and producing an output signal proportional thereto,
   combining means having a first input terminal coupled to said integrating means for receiving said integrated torque command output signal and a second input terminal coupled to said means for measuring angular velocity for producing an output error signal proportional to the difference between said integrated torque command signal and said output error signal, and
   motor means coupled to said combining means for receiving said output error signal and producing a torque output which is applied to said sensitive element thereby producing a change in said angular velocity, $\omega$, whereby the torque applied to said sensitive element is substantially equal to said commanded torque signal and is compensated for the presence of undesired disturbance torques on said assembly and anomolies in said control circuit.

2. A control torque command circuit as recited in claim 1 in which said means for integrating includes a circuit having a time constant, $T_1$, and a transfer function $T_1/T_1S+1$ and
   said combining means includes a matching circuit coupled between its second input and said sensing means having a transfer function $T_1S/T_1S+1$.

3. A control torque command circuit as recited in claim 2 in which said matching circuit includes a first circuit coupled to said sensing means having a time constant $T_2$ and a second circuit coupled between said first circuit and said second input on said combining means having a time constant $T_1$ wherein $T_2$ is very much greater than $T_1$ and has a negligible effect on the transfer characteristic of the matching circuit.

4. A control torque command circuit as recited in claim 1 in which said combining means includes an operational amplifier having a first non-inverting input terminal and a second inverting input terminal.

5. A control torque command circuit as recited in claim 1 in which said sensing means includes tachometer means for providing an output signal indicative of the number of revolutions of said sensitive element.

6. A control torque command circuit as recited in claim 1 in which said computing means includes means for providing said torque command signal in the form of a series of pulses,
   said torque command circuit further includes storage means coupled between said computing means and said integrating means for receiving said torque command signal in the form of a series of pulses, and
   said integrating means includes a series circuit in which a digital subtracter circuit has a first input terminal coupled to said output terminal of said storage means and its output terminal coupled to an input terminal on a shift register which has its output terminal coupled to said first input terminal on said combining means and to a second input terminal on said digital subtracter circuit.

7. A control torque command circuit as recited in claim 6 in which said combining means includes a digital subtractor circuit for producing an output error signal in the form of a series of pulses.

8. A control torque command circuit as recited in claim 7 in which said sensing means includes a digital tachometer means for providing a number of output pulses proportional to the number of revolutions of said sensitive element.

9. A control torque command circuit as recited in claim 8 further including a series circuit comprising a counter coupled to the output terminal of said digital tachometer means and a shift register coupled between the output terminal of said counter and said second input terminal of said combining means for providing an output signal in accordance with the angular velocity, $\omega$, of said sensitive element.

10. A control torque command circuit as recited in claim 7 further including a series circuit coupled between the output terminal of said combining means and said motor means for converting said output error signal in the form of a series of pulses into an analog output voltage which is applied to said motor means.

11. A control troque command circuit as recited in claim 10 in which said series circuit includes a shift register having an input terminal coupled to the output terminal of said combining means for producing a parallel binary output signal in accordance with said error signal.

12. A control torque command circuit as recited in claim 11 in which said series circuit further includes a digital-to-analog converter circuit responsive to said parallel binary output signal from said shift register for providing a variable amplitude d.c. output voltage in accordance with said error signal.

13. A control torque command circuit as recited in claim 12 in which said series circuit further includes integrating circuit means having its input terminal coupled to the output terminal of said digital-to-analog converter means for providing a variable amplitude d.c. output signal above a specified minimum amplitude, which minimum amplitude signal when coupled to said motor means will maintain said sensitive element rotating at a minimum angular velocity.

14. A control torque command circuit as recited in claim 13 in which said series circuit further includes pulse width modulator means coupled to said integrating circuit means for producing a variable pulse width output signal having pulse widths proportional to the amplitude of said variable amplitude d.c. output signal.

15. A control torque command circuit as recited in claim 14 in which said series circuit further includes power bridge means coupled between said pulse width modulator means and said motor means for providing power gain to said variable pulse width output signal.

16. A control torque command circuit as recited in claim 13 in which said series circuit further includes a linear power amplifier coupled between said integrating circuit and said motor means for providing power gain to said variable amplitude d.c. signal.

* * * * *